United States Patent [19]

Stumpf

[11] 4,280,782
[45] Jul. 28, 1981

[54] AIR CUSHION TABLE FOR TRANSPORTING LAYERS OF LAMINAR MATERIAL, E.G. LAYERS OF FABRIC

[76] Inventor: Günter O. Stumpf, Höhenweg 13, 7421 Mehrstetten, Fed. Rep. of Germany

[21] Appl. No.: 946,787

[22] Filed: Sep. 28, 1978

[30] Foreign Application Priority Data

Oct. 13, 1977 [DE] Fed. Rep. of Germany ....... 2746086

[51] Int. Cl.³ .......................... D06H 7/24; B26D 7/20
[52] U.S. Cl. ...................... 414/676; 269/20; 406/89
[58] Field of Search ..................... 414/676; 406/88, 89; 180/125; 269/20

[56] References Cited

U.S. PATENT DOCUMENTS

| 2,676,851 | 4/1954 | Sylvest | 406/89 |
| 2,990,939 | 7/1961 | Kelly | 414/676 X |
| 3,232,366 | 2/1966 | Cockerell | 414/676 X |
| 3,249,241 | 5/1966 | Rogers | 414/676 |
| 3,588,176 | 6/1971 | Byrne | 406/89 |
| 3,603,646 | 9/1971 | Leoff | 406/89 |

FOREIGN PATENT DOCUMENTS

| 1141588 | 12/1962 | Fed. Rep. of Germany | 406/89 |
| 7524530 | 11/1975 | Fed. Rep. of Germany | |
| 2504807 | 7/1976 | Fed. Rep. of Germany | |
| 2637769 | 8/1977 | Fed. Rep. of Germany | |

Primary Examiner—Leslie J. Paperner
Assistant Examiner—Terrance L. Siemens
Attorney, Agent, or Firm—Scully, Scott, Murphy & Presser

[57] ABSTRACT

An air cushion table for transporting layers of laminar material of loose consistency, e.g. layers of fabric, with compressed air lines disposed in the table plate and connectible to a compressed air source, the compressed air lines discharging with upwardly directed exit openings from the surface of the table plate. The compressed air line in the area of the exit opening is in each case provided with an insert made of porous material which occupies the cross-section of the compressed air line.

5 Claims, 3 Drawing Figures

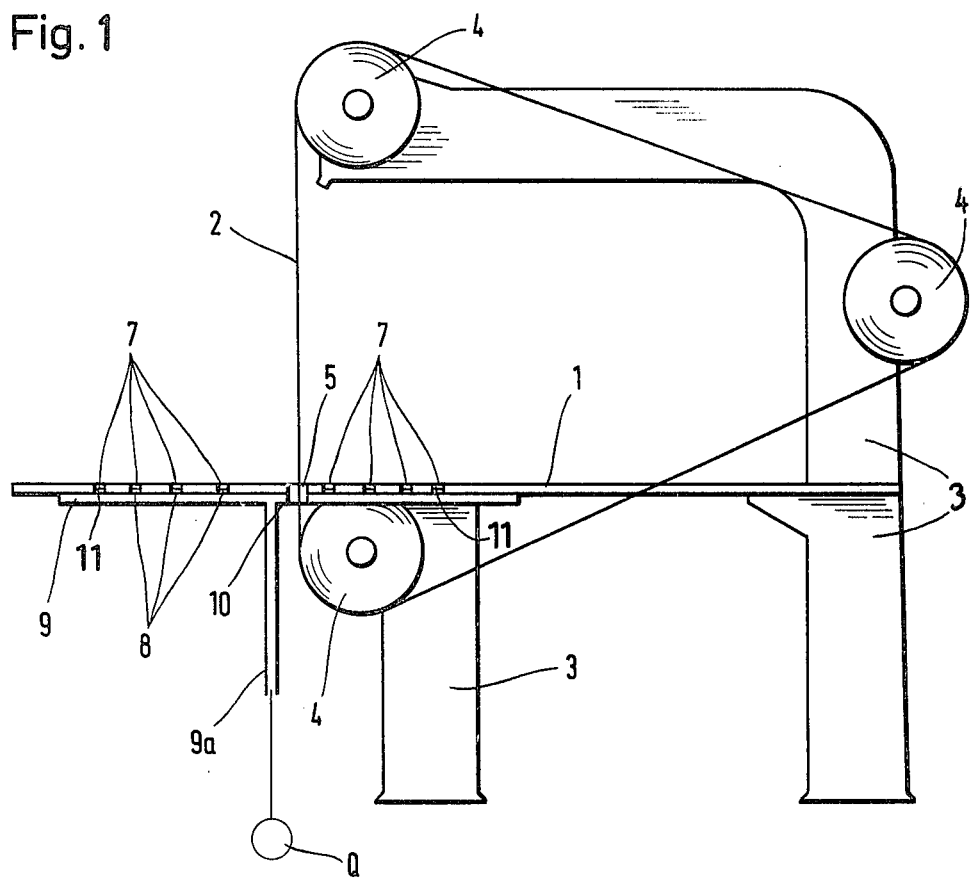
Fig. 1
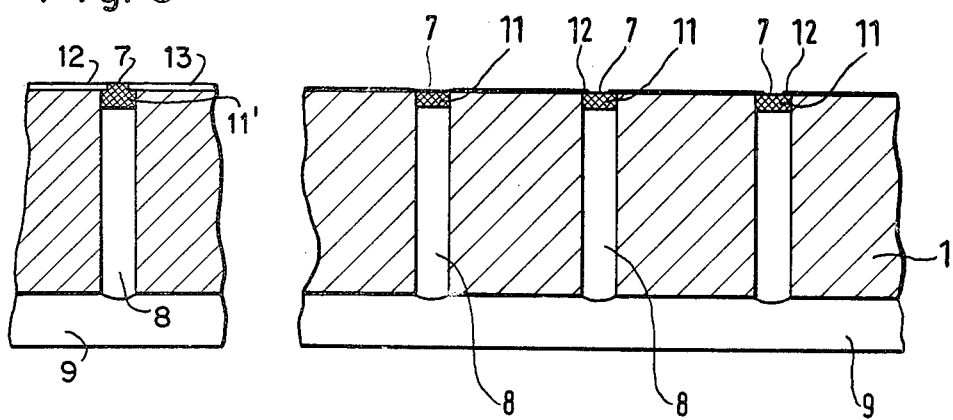
Fig. 3
Fig. 2

AIR CUSHION TABLE FOR TRANSPORTING LAYERS OF LAMINAR MATERIAL, E.G. LAYERS OF FABRIC

The invention relates to an air cushion table for transporting layers of laminar material of loose consistency, e.g. layers of fabric, with compressed air lines disposed in the table plate and connectible to a compressed air source, said compressed air lines discharging with upwardly directed exit openings from the surface of the table plate. An air cushion table of this type may be used for belt or reciprocating blade machines or the like for cutting stacks of fabric layers to size or for purely transporting purposes, e.g. as a laying or transporting table.

An air cushion table such as this is known through German Auslegeschrift No. 25 04 807. The sections of the compressed air lines which have the exit openings are here disposed vertically, so that the compressed air jets exit vertically upwards and form the desired air cushion between the surface of the table plate and the underside of a stack of fabric layers. Since the exit openings of the table plate are not always covered by the stack of fabric layers due chiefly to the movement and rotation of the fabric layer stack occuring during the cutting process, the compressed air jets emerging from these uncovered exit openings are blasted into the face of the operator who is bending over the table, which is very annoying and uncomfortable.

Even if the exit openings in the cutting table known through the German Utility Model No. 75 24 530 point obliquely upwards away from the operator's position, discomfort for the operator by compressed air jets striking his face cannot be avoided since the operator must sometimes bend right over the table in order, for example, to be able to observe the cutting process carefully.

Finally, there is an air cushion table for cutting and fabric laying devices known through German Auslegeschrift No. 26 37 769 in which the sections of the compressed air lines which have the exit openings are designed as annular ducts whose diameter increases towards the exit opening. This produces a compressed air jet emerging in roughly the shape of a truncated cone, this still being uncomfortable and annoying for the operator for the reasons stated above, particularly since the jet is also directed laterally upwards, by reason of its truncated cone shape, towards the operator's position and can strike his face even before the operator bends over the table plate.

The object underlying the invention is to create an air cushion table of the type stated at the beginning such that discomfort for the operator by the compressed air jets emerging from the exit openings is reliably and to the greatest possible extent avoided.

To achieve this object, it is suggested, with an air cushion table of the type specified at the outset, that the compressed air line in the area of the exit opening is in each case provided with an insert made of porous material which occupies the cross-section of the compressed air line.

The compressed air jet emerging from the exit opening is broken by the filter-like porous insert such that just a few millimeters above the table plate there is no longer any discomfort felt by the operator. It has emerged, surprisingly, that this beneficial effect is achieved without the formation and maintaining of the air cushion, for example, being impaired by the porous material insert and without it being vital whether the exit openings point vertically or obliquely upwards.

The insert may consists of glass wool inside a fabric covering, sand or a similar filter material or an open-cell foam, preferably hard foam. It is very advantageous, however, if the insert is made of sintered bronze which is a highly porous cohesive material and is therefore particularly well suited to the present purpose. Sintered bronze may, for example be used with a filtration grade of 80 to 200 $\mu$m, preferably from 100 $\mu$m and a tensile strength of 2.0 to 3.5 kp/mm$^2$ and an expansion of 4 to 7%. A further advantage of sintered bronze is the prevention of premature corrosion.

Expediently, the insert is designed in the shape of a plate which depending on the compressed air line's cross-section may have, for instance, a diameter of 6 to 8 mm and a thickness of 2 to 3 mm.

Particularly if the insert is disposed such that the surface of the insert is flush with the surface of the table plate is the impression avoided of a perforated table plate, arising in the known air cushion tables, since what is now produced is a closed table-plate surface in the optical and—in the case of the resistant sintered bronze—also the mechanical sense, but not in the pneumatic sense.

The insert can be secured in the compressed air line by pressing in, gluing in or some similar manner.

It is expedient if in the compressed air's direction of flow, the insert butts against an inner circular shoulder of the compressed air line.

Forms of construction of the invention are represented by way of example in the drawing.

FIG. 1 shows an air cushion table disposed in a belt-cutter fabric cutting machine in a view from the side, the table plate being represented in section, and FIG. 2 shows a section from the table plate in section.

FIG. 3 illustrates an embodiment of the present invention wherein the surface of each porous insert is flush with the surface of the air cushion table.

According to FIG. 1, the belt-cutter fabric cutting machine has a stationarily disposed cutting member 2 in the form of a belt cutter rotating via three deflection rollers 4 mounted on the table frame 3, said belt cutter vertically penetrating a recess 5 provided in the table plate 1. A drive (not shown) is coordinated with one of the deflection rollers 4.

Using the fabric cutting machine represented, layer stacks consisting of superposed layers of fabric or the like are cut to size by the operator moving them by hand on the table plate 1 relative to the cutting member 2 and rotating them following the outlines of a cutting pattern or cutting image marked on the topmost layer of fabric, such that the cutting member 2 cuts along the outlines as accurately as possible.

The table plate 1 has upwardly directed exit openings 7 connected to a compressed air source Q. The exit openings 7 are ports, lying in the plane of the surface of the table plate 1, of compressed air lines 8 disposed in the table plate 1.

According to FIG. 1, there is provided beneath the table plate 1 a distributor trough or line 9 connected by a line 9a to the compressed air source Q, which tightly abuts the underside of the table plate 1 with its margin. The compressed air lines 8 discharge from above into the distributor trough or line 9. The recess 5 provided in the table plate 1 for the passage through of the cutting member 2 is sealed off from the interior of the distributor trough or line 9 by a pipe-section-like wall 10.

In the area of the exit opening 7, each compressed air line 8 is provided with a plate-shaped insert 11 made of porous material, preferably sintered bronze, which fills the cross-section of the compressed air line 8 completely. The surface of the insert 11 is flush with the surface of the table plate 1. In the form of construction according to FIG. 2 the insert 11 located in the two right-hand compressed air lines 8 butts in flow direction of the compressed air against an inside circular shoulder 12 of the compressed air line 8. Instead of the circular shoulder which is made as flat as possible, it is feasible to provide two or more inside projections of the compressed air line 8. The insert 11 located in the left-hand compressed air line 8 is secured in the compressed air line purely by pressing and/or gluing it in.

FIG. 3 illustrates an embodiment of the present invention wherein the surface of each porous insert 11' is flush with the surface 13 of the air cushion table.

The air cushion table represented may also be used for transporting or for laying out layers of fabric or the like as a transporting or laying table, i.e. without combining it with a cutting machine.

Surprisingly, it has emerged that the advantageous effect of avoiding air blasting towards the operator is achieved without the air consumption appreciably increasing.

I claim:

1. An arrangement for cutting layers of a lamina material with a cutting member which is stationary relative to the surface area of a support plate through which said cutting member extends, said support plate comprising an air cushion table provided with upwardly directed air outlet apertures which are connected with a compressed air source and are directed beneath the layers of lamina material, and wherein the layers of lamina material are displaced by hand across the surface of the air cushion table during a cutting operation, characterized by the collective compressed air conduits (8) in the area of the outlet openings (7) being provided within plate-shaped inserts (11) of less thickness than their diameters of porous sintered material which correspond to the cross sectional area of the compressed air conduits.

2. An arrangement according to claim 1, characterized in that each insert (11) is composed of sintered bronze.

3. An arrangement according to claim 1 or 2, characterized in that in the direction of flow of the compressed air, each insert (11) abuts against an inner circular shoulder (12) in a compressed air conduit (8).

4. An arrangement according to claim 1 or 2, characterized in that the surface of the insert (11) is flush with the surface of the table support plate (1).

5. An arrangement according to claim 4, characterized in that in the direction of flow of the compressed air, each insert abuts against an inner circular shoulder in a compressed air conduit.

* * * * *